(12) United States Patent
Yamada et al.

(10) Patent No.: US 9,507,234 B2
(45) Date of Patent: Nov. 29, 2016

(54) REFLECTION-TYPE LIGHT CONTROL ELEMENT, REFLECTION-TYPE LIGHT CONTROL MEMBER, AND MULTILAYER GLASS

(71) Applicants: Yasusei Yamada, Aichi (JP); Kazuki Yoshimura, Aichi (JP); Kazuki Tajima, Aichi (JP)

(72) Inventors: Yasusei Yamada, Aichi (JP); Kazuki Yoshimura, Aichi (JP); Kazuki Tajima, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 133 days.

(21) Appl. No.: 14/346,748

(22) PCT Filed: Sep. 21, 2012

(86) PCT No.: PCT/JP2012/074292
§ 371 (c)(1),
(2) Date: Mar. 24, 2014

(87) PCT Pub. No.: WO2013/047392
PCT Pub. Date: Apr. 4, 2013

(65) Prior Publication Data
US 2014/0247474 A1    Sep. 4, 2014

(30) Foreign Application Priority Data

Sep. 30, 2011  (JP) .................................. 2011-218134
Mar. 12, 2012  (JP) .................................. 2012-055155

(51) Int. Cl.
*G02F 1/01*    (2006.01)
*G02F 1/19*    (2006.01)
(Continued)

(52) U.S. Cl.
CPC . *G02F 1/19* (2013.01); *E06B 9/24* (2013.01); *E06B 2009/2405* (2013.01); *E06B 2009/2464* (2013.01); *G02F 1/153* (2013.01); *G02F 2202/34* (2013.01); *G02F 2203/02* (2013.01)

(58) Field of Classification Search
CPC ................ C03C 2217/242; E06B 2009/2405; E06B 2009/2464; E06B 3/6715; E06B 3/6722; E06B 9/24; G02F 1/153; G02F 1/19; G02F 2202/34; G02F 2203/02
USPC ......................................... 359/240, 275, 265
See application file for complete search history.

(56) References Cited

U.S. PATENT DOCUMENTS 4,573,768 A   3/1986 Polak et al.
5,635,729 A   6/1997 Griessen et al.
(Continued)

FOREIGN PATENT DOCUMENTS

JP    2004-514933    5/2004
JP    2004-279619    10/2004
(Continued)

OTHER PUBLICATIONS

International Search Report mailed on Oct. 23, 2012.
(Continued)

*Primary Examiner* — Thomas K Pham
*Assistant Examiner* — Vipin Patel
(74) *Attorney, Agent, or Firm* — IPUSA, PLLC

(57) ABSTRACT

A reflection-type light control element according to the present invention is provided with a light control layer configured to exhibit a reversible change between a transparent state and a reflection state in a reversible reaction with a hydrogen and a catalyst layer configured to accelerate the reversible reaction of the light control layer, wherein the reflection-type light control element is such that the light control layer includes an alloy that contains at least one kind of element selected from a group composed of group 2 elements and at least two kinds of elements selected from a group composed of group 3 elements and rare earth elements, or a hydride of the alloy.

9 Claims, 8 Drawing Sheets

(51) Int. Cl.
*E06B 9/24* (2006.01)
*G02F 1/153* (2006.01)

(56) References Cited

U.S. PATENT DOCUMENTS

| | | | |
|---|---|---|---|
| 5,905,590 A * | 5/1999 | Van Der Sluis | G02F 1/1523 359/265 |
| 6,647,166 B2 | 11/2003 | Richardson | |
| 7,733,310 B2 * | 6/2010 | Hajjar | B82Y 10/00 345/84 |
| 2002/0089732 A1* | 7/2002 | Ouwerkerk et al. | 359/237 |
| 2004/0021921 A1* | 2/2004 | Richardson | G02F 1/19 359/265 |
| 2004/0206024 A1 | 10/2004 | Graf et al. | |
| 2006/0209381 A1 | 9/2006 | Uchida | |
| 2008/0013160 A1 | 1/2008 | Yoshimura et al. | |
| 2010/0039692 A1 | 2/2010 | Yamada et al. | |
| 2012/0241796 A1* | 9/2012 | Naito | 257/98 |

FOREIGN PATENT DOCUMENTS

| | | |
|---|---|---|
| JP | 2004-279669 | 10/2004 |
| JP | 2005-525484 | 8/2005 |
| JP | 2007-301778 | 11/2007 |
| JP | 2008-020586 | 1/2008 |
| JP | 2010-066747 | 3/2010 |
| KR | 10-2002-0071027 | 9/2002 |
| WO | 02/42831 | 5/2002 |

OTHER PUBLICATIONS

Shanhu Bao et al., Optical property and cycling durability of polytetrafluoroethylene top-covered and metal buffer layer inserted Mg-Ni switchable mirror, Solar Energy Materials & Solar Cells 93 (2009) 1642-1646.
Korean Office Action mailed Sep. 25, 2015.
Japanese Office Action mailed Oct. 6, 2015.

* cited by examiner

REFLECTION-TYPE LIGHT CONTROL ELEMENT, REFLECTION-TYPE LIGHT CONTROL MEMBER, AND MULTILAYER GLASS

TECHNICAL FIELD

One aspect of the present invention relates to at least one of a reflection-type light control element, a reflection-type light control member, and a multilayer glass.

BACKGROUND ART

In general, a window (opening) of a house or building is a location for the transfer in and out of a lot of heat. For example, a rate of heat loss flowing from a window in a case of heating in winter is approximately 48% and a rate of heat inflowing from a window in a case of cooling in summer is even approximately 71%. Therefore, it is possible to obtain an effect of enormous energy saving by appropriately controlling light or heat through a window.

A light control glass has been developed for such a purpose and has a function of controlling an inflow and/or outflow of light and/or heat.

There are some kinds of methods for conducting a light control of such a light control glass. Among those, 1) a material with a light transmittance that is reversibly changed by applying an electric current or an electric voltage thereto is referred to as an electrochromic material, 2) a material with a light transmittance that is changed depending on a temperature is referred to as a thermochromic material, and further, 3) a material with a light transmittance that is changed by a control of an atmospheric gas is referred to as a gasochromic material. Among these, a study of an electrochromic light control glass that uses a tungsten oxide thin film for a light control layer is most advanced, so that a stage of practical application has generally been attained at present and a marketed product has also been provided.

However, an electrochromic light control glass wherein a tungsten thin film is used for this light control layer is such that a principle thereof is that light is absorbed by the light control layer to conduct a light control. Therefore, there is a problem in that the energy saving effect is degraded because a light control layer absorbs light so as to be heated and it is also re-radiated into the room interior. In order to eliminate this, a light control is not conducted by absorbing light and it is necessary to conduct a light control by reflecting light. That is, a material (reflection-type light control element) has been desired that has a characteristic in such a manner that a state thereof is reversibly changed between a transparent state and a reflection state.

For a material that has such a characteristic, it has been found and reported in recent years that a state is reversibly changed between a transparent state and a reflection state due to a hydrogenation and a dehydrogenation of a rare earth metal such as a yttrium or a lanthanum (see, for example, U.S. Pat. No. 5,635,729).

Otherwise, an alloy of a rare earth metal such as a gadolinium and a magnesium (see, for example, U.S. Pat. No. 5,905,590), an alloy of a magnesium and a transition metal (for example, see U.S. Pat. No. 6,647,166), and an alloy of an alkaline-earth metal such as a calcium and a magnesium (for example, see Japanese Patent Application Publication No. 2010-066747) have already been known as a material that has a reflection-type light control characteristic (light control mirror characteristic).

However, a switching repetition durability of the above-mentioned reflection-type light control element between a transparent state and a reflection state is low. Accordingly, a method that interposes a buffer layer between a layer that has a reflection-type light control characteristic and a catalyst layer and further forms a hydrogen-permeable and water-repellent protection layer on a surface of the catalyst layer has been conducted in order to improve durability. However, there is a problem in that a switching repetition durability of about 1600 times is not provided even if a buffer layer or a protection layer is provided (for example, see Bao, et al., Solar Energy Materials & Solar Cells, Vol. 93, 1642 (2009)).

SUMMARY OF THE INVENTION

According to one aspect of the present invention, there is provided a reflection-type light control element, wherein the reflection-type light control element is provided with a light control layer configured to exhibit a reversible change between a transparent state and a reflection state in a reversible reaction with a hydrogen and a catalyst layer configured to accelerate the reversible reaction of the light control layer, and wherein the reflection-type light control element is such that the light control layer includes an alloy that contains at least one kind of element selected from the group composed of group 2 elements and at least two kinds of elements selected from the group composed of group 3 elements and rare earth elements or a hydride of the alloy.

According to another aspect of the present invention, there is provided a reflection-type light control member that is provided with the reflection-type light control element as described above, wherein the reflection-type light control member is further provided with a transparent member at an opposite side of the catalyst layer in the light control layer.

According to another aspect of the present invention, there is provided a multilayer glass, wherein the multilayer glass is provided with a plurality of glass plates, and the reflection-type light control element described above on a surface of at least one glass plate that is opposed to another glass plate.

EMBODIMENTS FOR IMPLEMENTING THE INVENTION

Modes (Embodiments) for implementing the present invention will be described with reference to the drawings below, wherein the present invention is not limited to the embodiments described below and it is possible to apply a variety of modifications and substitutions to the embodiments described below without departing from the scope of the present invention.

First Embodiment

In the present embodiment, a reflection-type light control element will be described as an embodiment of the present invention.

A reflection-type light control element as an embodiment of the present invention is provided with a light control layer with a state that is reversibly changed between a transparent state due to a hydrogenation and a reflection state due to a dehydrogenation and a catalyst layer that accelerates the hydrogenation and/or the dehydrogenation in the light control layer. Then, a light control layer is characterized by being composed of an alloy that includes at least one kind of element selected from group 2 elements and two or more kinds of elements selected from group 3 elements and rare earth elements, and/or a hydride of the alloy.

Figure 1:
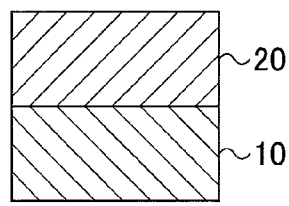
FIG. 1 is a cross-sectional view of a reflection-type light control element according to a first embodiment of the present invention.

FIG. 1 illustrates a configuration example of a reflection-type light control element as an embodiment of the present invention. As illustrated in the figure, a reflection-type light control element as a first embodiment is provided with a light control layer 10 and a catalyst layer 20.

The light control layer 10 has a chromic characteristic in such a manner that a state thereof is reversibly changed between a transparent state due to a hydrogenation and a reflection state (metallic state) due to a dehydrogenation. That is, the light control layer 10 has a function of adjusting a light transmittance. The light control layer 10 is composed of an alloy that includes at least one kind of element selected from group 2 elements and two or more kinds of elements selected from group 3 elements and rare earth elements and/or a hydride of the alloy, as a characteristic configuration thereof.

Such an alloy occludes a hydrogen to be a colorless or transparent state and release a hydrogen to be a silver reflection state. Here, the light control layer 10 may include an element other than those of the above-mentioned alloy as a trace component (inevitable component).

There are three kinds of methods for conducting a hydrogenation and/or a dehydrogenation of the light control layer 10. A first method is generally referred to as a gasochromic method and is a method that exposes the light control layer 10 to a gas that includes a hydrogen to conduct a hydrogenation and expose the light control layer 10 to a gas that includes an oxygen (air) to conduct a dehydrogenation. A second method is generally referred to as an electrochromic method and is a method that conducts a hydrogenation and/or a dehydrogenation of the light control layer 10 by using a liquid electrolyte (electrolyte fluid). A third method is generally referred to as an electrochromic method and is a method that conducts a hydrogenation and/or a dehydrogenation of the light control layer 10 by using a solid electrolyte.

An alloy that is included in the light control layer 10 will be described. A group 2 element and/or a rare earth element that constitute(s) an alloy is/are not particularly limited as long as at least one kind of group 2 element and two or more kinds of elements selected from group 3 elements and rare earth elements are included.

In particular, for a group 2 element, it is preferable to be either one or both of Mg and Ca because of availability, cost, and/or stability in an atmospheric air, and it is more preferable to be Mg.

Furthermore, a group 3 element and a rare earth element are also not limited and it is preferable to be, for example, two or more kinds selected from Sc, Y, La, Gd, and Ce.

For a specific alloy that constitutes a light control layer and includes at least one kind of element selected from the group 2 element and two or more kinds of elements selected from group 3 elements and rare earth elements, it is possible to use, for example, a magnesium-yttrium-scandium alloy (that will also be described as a "magnesium-scandium-yttrium alloy" below) preferably.

Because a magnesium-yttrium-scandium alloy exhibits a good chromic characteristic independently of its composition, the composition is not limited. In particular, it is preferable for a magnesium-yttrium-scandium ally to be $Mg_{1-x-y}Y_xSc_y$ ($0.3<x<0.7$, $0<y<0.6$, and $x+y<1$), because a high light transmittance at a transparent state, an excellent switching repetition durability, and/or a small width of a change in a transmittance is/are provided. Furthermore, $Mg_{1-x-y}Y_xSc_y$ ($0.3<x<0.65$, $0.02<y<0.4$, and $x+y<1$) is more preferable.

A film thickness of the light control layer 10 is selected in view of a light transmittance, a durability, and/or the like and is not particularly limited, and it is preferable to be equal to or greater than 10 nm and equal to or less than 200 nm. This is because, if less than 10 nm is provided, a light reflectance at a reflection state may not be sufficient, while, if greater than 200 nm is provided, a light transmittance at a transparent state may not be sufficient.

A method for formation of the light control layer 10 is not particularly limited and a general film formation method is used. For example, a sputtering method, a vacuum deposition method, an electron beam deposition method, a chemical vapor deposition method (CVD), or a plating method is used.

The catalyst layer 20 is formed on the light control layer 10 as illustrated in FIG. 1 and has a function of accelerating a hydrogenation and/or a dehydrogenation in the light control layer 10. A sufficient switching rate from a transparent state to a reflection state and a sufficient switching rate from the reflection state and the transparent state are ensured by the catalyst layer 20.

It is sufficient for the catalyst layer 20 to have a function of accelerating a hydrogenation and/or a dehydrogenation of the light control layer 10 and no particular limitation is provided thereto, wherein it is preferable to be composed of, for example, a palladium, a platinum, a palladium alloy, or a platinum alloy, that is, to be constituted by a metal selected from these ones. In particular, a palladium with a high hydrogen permeability is used preferably.

A film thickness of the catalyst layer 20 is appropriately selected depending on a reactivity of a light control layer and/or a catalytic power of the catalyst layer and is not limited, and it is preferable to be equal to or greater than 1 nm and equal to or less than 20 nm. It is because, if less than 1 nm is provided, a function of a catalyst may not sufficiently be exerted, while, if greater than 20 nm is provided, a light transmittance may not be sufficient despite of no change in improvement of a function of a catalyst.

A method for formation of the catalyst layer 20 is not particularly limited and it is possible to apply a general film formation method thereto. Specifically, as a method for formation of the catalyst layer 20, it is possible to use, for example, a sputtering method, a vacuum deposition method, an electron beam deposition method, a chemical vapor deposition method (CVD), a plating method, or the like.

As described above, it is possible for a reflection-type light control element as an embodiment of the present invention that uses a predetermined material(s) for the light control layer 10 to provide a high switching repetition durability thereof, as compared with a case where a conventional magnesium-nickel or magnesium-calcium alloy is used. Furthermore, it is possible to provide a reflection-type light control element with a high light transmittance and an excellent light control characteristic in a case where a transparent state is provided by a hydrogenation.

Second Embodiment

In the present embodiment, a reflection-type light control element will be described wherein a protection layer is further provided to the reflection-type light control element described in the first embodiment.

Figure 2:
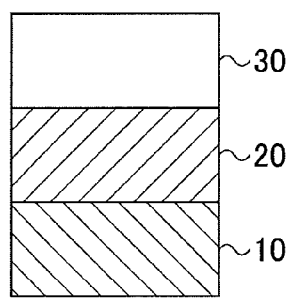
FIG. 2 is a cross-sectional view of a reflection-type light control element according to a second embodiment of the present invention.

FIG. 2 illustrates a configuration example of a reflection-type light control element in the present embodiment.

A reflection-type light control element in the present embodiment is such that the reflection-type light control element described in the first embodiment is further provided with a protection layer 30, wherein a configuration other than the protection layer 30 is similar to that described in the first embodiment and hence a description(s) thereof will be omitted herein.

The protection layer 30 is formed at an opposite side of a light control layer 10 with reference to a catalyst layer 20, that is, on a face of the catalyst layer 20 at an opposite side of the light control layer 10, is a layer that has a hydrogen permeability and a water-repellency, and has a function of preventing an oxidation of the light control layer 10 as caused by a water or an oxygen, by cooperating with the catalyst layer 20.

Because the catalyst layer 20 also has a function of preventing oxidation of the light control layer 10 but an oxidation prevention function of only the catalyst layer 20 may not be sufficient, the protection layer 30 is formed so that it is possible to improve a function of preventing oxidation of the light control layer 10.

The protection layer 30 has a hydrogen (hydrogen ion) permeability (hydrogen permeability) as described above and has a water non-permeability (water repellency), and one having such a characteristic is used as a material for constituting a protection layer.

As long as a material of the protection layer 30 has a hydrogen permeability and a water repellency in combination, such a material is not limited, and for example, a polymer such as a poly(vinyl acetate), a poly(vinyl chloride), a poly(styrene), or cellulose acetate or an inorganic thin film such as a titanium oxide thin film is used.

For a method for formation of the protection layer 30, it is possible to use a general film formation method. For example, a method for applying and drying a dispersion fluid with a polymer dispersed therein or a method for conducting formation of a film of an inorganic material by a sputtering method is used for a method for formation of the protection layer 30.

It is possible to prevent oxidation of the light control layer 10 as caused by a water or an oxygen, by providing the protection layer 30. Accordingly, it is possible to prevent degradation of the light control layer 10 and improve durability thereof.

Third Embodiment

In the present embodiment, a reflection-type light control member will be described wherein the reflection-type light control element described in the first embodiment or the second embodiment is provided with a transparent member.

Figure 3:
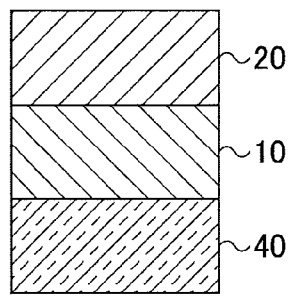
FIG. 3 is a cross-sectional view of a reflection-type light control member according to a third embodiment of the present invention.

FIG. 3 illustrates a configuration example of a reflection-type light control member in the present embodiment.

A reflection-type light control member in the present embodiment is such that the reflection-type light control element described in the first embodiment is provided with a transparent member (transparent substrate) 40 at an opposite side of a catalyst layer 20 with reference to a light control layer 10.

The transparent member 40 has a function of a base for a reflection-type light control element. Furthermore, it is preferable for the transparent member 40 to have a function of preventing oxidation of the light control layer 10 as caused by a water or an oxygen. The transparent member 40 may be provided in a sheet or film form, wherein a shape thereof is not limited, and may have flexibility.

It is sufficient for the transparent member 40 to transmit visible light and a material thereof is not limited, wherein it is preferable to use a glass or a plastic.

Herein, for a plastic, a poly(ethylene terephthalate) (PET), a poly(ethylene naphthalate) (PEN), a nylon, or an acryl is used preferably.

It is possible to obtain a reflection-type light control member that has a light control function by providing the transparent member 40 on a surface of the light control layer 10. It is possible to apply this reflection-type light control member widely to various kinds of articles as well as a window glass of a building or house or a vehicle. For example, it is possible to add a light control mirror function to a shield for a purpose of protection of privacy, an ornament that utilizes switching between a reflection state and a transparent state, a toy, and the like.

Here, although a reflection-type light control member in the present embodiment has been described wherein the reflection-type light control element described in the first embodiment is provided with a transparent member, it is possible to provide a reflection-type light control member wherein the reflection-type light control element described in the second embodiment is provided with a transparent member. That is, a protection layer that has a hydrogen permeability and a water repellency is provided at an opposite side of a light control layer 10 with reference to a catalyst layer 20 in the configuration of FIG. 3. In this case, it is possible, and hence, preferable, to prevent degradation of the light control layer 10 and improve durability thereof, as described in the second embodiment.

Fourth Embodiment

In the present embodiment, a multilayer glass will be described that is provided with the reflection-type light control element described in the first embodiment or the second embodiment.

Specifically, a multilayer glass in an embodiment of the present invention is a multilayer glass that is provided with two or more glass plates, and that is provided with the reflection-type light control element described in the first embodiment or the second embodiment on a face of at least one glass plate that is opposed to (an)other glass plate(s).

Then, it is preferable to be provided with an atmosphere control machine that supplies and/or exhausts a hydrogen and an oxygen or an air to a gap(s) formed by a glass plate with a reflection-type light control element and the (an)other glass plate(s).

Figure 4:
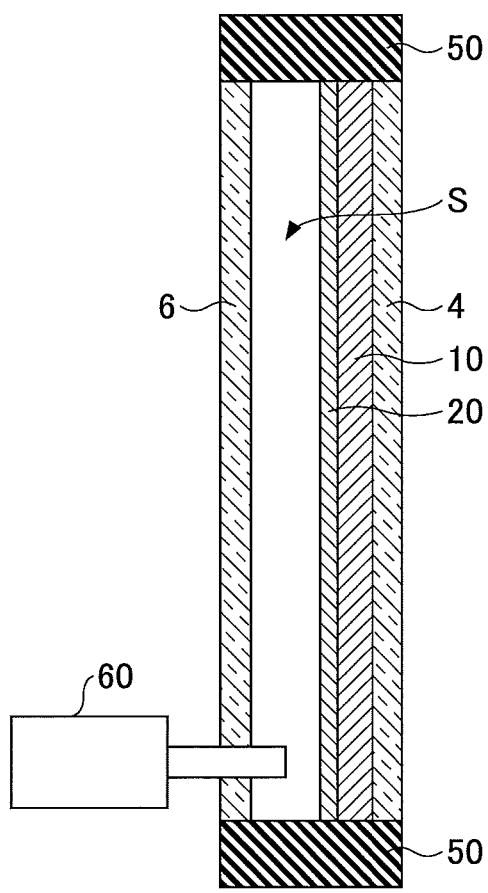
FIG. 4 is a cross-sectional view of a multilayer glass according to a fourth embodiment of the present invention.

FIG. 4 illustrates a configuration example of a multilayer glass in an embodiment of the present invention.

FIG. 4 illustrates a cross-sectional view of a multilayer glass in the present embodiment. As its configuration is described, a multilayer glass is provided with two glass plates 4 and 6, wherein one glass plate 4 is provided with the reflection-type light control element illustrated in FIG. 1 on an inside face, that is, a face at a side of opposing of both glass plates. That is, a light control layer 10 and a catalyst layer 20 are sequentially formed (deposited) on an inside face of one glass plate 4. Here, as described in the second embodiment, a protection layer 30 may be formed at an opposite side of the light control layer 10 with reference to the catalyst layer 20. Furthermore, the light control layer 10 and the catalyst layer 20 may sequentially be formed an inside face of each of both glass plates 4 and 6.

As illustrated in FIG. 4, a multilayer glass is provided with a gas filling chamber S in a gap between the two glass plates 4 and 6 and an opening thereof is sealed with a seal member 50. An argon gas is preliminarily enclosed in the gas filling chamber S. An atmosphere controller 60 is to supply and/or exhaust a hydrogen, and an oxygen or an air to the gas filling chamber S. For example, the atmosphere controller 60 electrolyzes a water to supply a hydrogen gas and/or an oxygen gas and exhausts a gas in the gas filling chamber S to an exterior thereof by using a vacuum pump.

As a hydrogen is supplied to the gas filling chamber S, the light control layer 10 is hydrogenated via the catalyst layer 20 to be a transparent state thereof. Furthermore, as an oxygen or an air is supplied to the gas filling chamber S, the light control layer 10 is dehydrogenated via the catalyst layer 20 to be a reflection state thereof. Therefore, an atmosphere in the gas filling chamber S is controlled by the atmosphere controller 60, so that it is possible to control a state thereof reversibly between a transparent state and a reflection state. Furthermore, as a gas supply or exhaust is stopped, it is possible to keep the state as it is. Thereby, it is possible to obtain a multilayer glass for conducting a light control based on a gasochromic method.

At present, a multilayer glass becomes popular in a house and using of a multilayer glass is becoming mainstream in a newly built house. It is possible to utilize an internal space as the gas filling chamber S for switching by providing as inner side of a multilayer glass with a reflection-type light control element.

Here, although an example of a multilayer glass with two glass plates has been described in the present embodiment, the number of glass plates is not limited to two and even more glass plates may be included.

Then, it is possible to provide nearly colorless transparent state due to a hydrogenation and/or it is possible to provide a multilayer glass with a high switching repetition durability, because a reflection-type light control element with the light control layer 10 that is composed of a predetermined material(s) is used, as having already been described.

PRACTICAL EXAMPLES

Although embodiments of the present invention will be described in detail by practical examples below, the present invention is not limited to such practical examples.

Practical Example 1

In the present practical example, a reflection-type light control layer was fabricated wherein a light control layer 10 that was composed of a magnesium-scandium-yttrium alloy and a catalyst layer 20 were sequentially deposited on a glass substrate that was a transparent member, and an evaluation thereof was conducted.

Specifically, a magnesium-scandium-yttrium alloy thin film with a thickness of 48 nm (light control layer 10) and a palladium thin film with a thickness of 7 nm (catalyst layer 20) were sequentially film-formed on a glass substrate 4 with a thickness of 1 mm (transparent member).

Specific film formation conditions of the light control layer 10 and the catalyst layer 20 will be described.

A film formation of the magnesium-scandium-yttrium alloy thin film as the light control layer 10 and the palladium thin film as the catalyst layer 20 was conducted by using a magnetron sputtering device capable of a multi-element film formation.

A metallic magnesium, a metallic scandium-metallic yttrium, and a metallic palladium as targets were set at three sputtering guns, respectively. Herein, a target of the metallic scandium-metallic yttrium was a target that contained both metals of a metallic scandium and a metallic yttrium.

First, the glass plate was washed, and subsequently, set in a vacuum device and evacuation was conducted in a chamber thereof.

Then, a voltage was simultaneously applied to targets of the metallic magnesium and the metallic scandium-metallic yttrium to fabricate a magnesium-scandium-yttrium alloy thin film.

An argon gas pressure during sputtering was 0.3 Pa and sputtering was conducted by applying a predetermined power to each target by a direct current sputtering method. Here, at this time, it was possible to select and/or control a composition of an obtained film (light control layer) depending on a power (electric power) to be applied to each target.

In the present practical example, when a representation of $Mg_{1-x}(Sc_{1-y}Y_y)_x$ is provided, samples 1-5 were fabricated in such a manner that x and y were (x, y)=(0.4, 0.52), (0.57, 0.56), (0.62, 0.57), (0.66, 0.58), and (0.77, 0.58), respectively.

Here, when such a composition is represented by a chemical formula of $Mg_{1-x-y}Y_xSc_y$ used in Practical Example 2 described below, x and y were represented by (x, y)=(0.21, 0.19), (0.32, 0.25), (0.35, 0.27), (0.38, 0.28), and (0.45, 0.32) (that were rounded off to two decimal places).

A calibration curve of an obtained composition was estimated from a ratio of powers applied to the metallic magnesium target and the metallic scandium-metallic yttrium target and by a Rutherford back scattering spectrometry, and a composition of a fabricated sample was estimated from this curve.

Table 1 indicates a power applied to a sputtering target in a case where each sample was fabricated.

TABLE 1

| | | Applied electric power (W) | |
|---|---|---|---|
| | Composition | Metallic magnesium target | Metallic scandium - metallic yttrium target |
| Sample 1 | $Mg_{0.60}(Sc_{0.48}Y_{0.52})_{0.40}$ | 30 | 60 |
| Sample 2 | $Mg_{0.43}(Sc_{0.44}Y_{0.56})_{0.57}$ | 20 | 60 |
| Sample 3 | $Mg_{0.38}(Sc_{0.43}Y_{0.57})_{0.62}$ | 17 | 59.5 |
| Sample 4 | $Mg_{0.34}(Sc_{0.42}Y_{0.58})_{0.66}$ | 15 | 60 |
| Sample 5 | $Mg_{0.23}(Sc_{0.42}Y_{0.58})_{0.77}$ | 10 | 60 |

Subsequently, a power of 30 W was applied to a target of a metallic palladium on the same vacuum condition to conduct deposition of a palladium thin film.

A reflection-type light control member fabricated in accordance with the aforementioned sequence was in a reflection state of metallic luster, and when a surface of the palladium thin film was exposed to a hydrogen gas at 1 atmosphere that was diluted with argon to 4% by volume (that will be referred to as a "hydrogen-containing gas", below), any sample changed to a transparent state due to hydrogenation of the magnesium-scandium-yttrium alloy thin film. On this condition, when the surface of the palladium thin film was exposed to atmospheric air, a return to the reflection state was caused by dehydrogenation of the magnesium-scandium-yttrium alloy thin film. Thus, it was possible to confirm that a state of the fabricated reflection-type light control member reversibly changed between the transparent state due to hydrogenation and the reflection state due to dehydrogenation.

Figure 5:
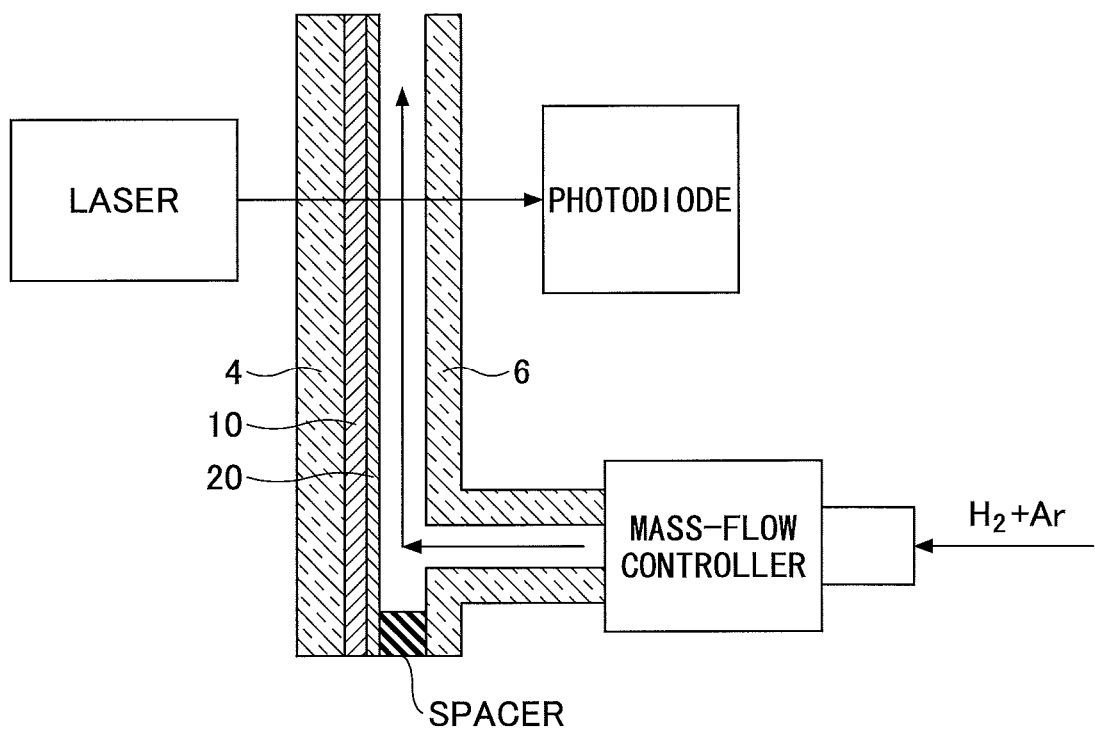
FIG. 5 is a cross-sectional view that illustrates a configuration of a measurement device for a laser light transmittance in Practical Example 1 of the present invention.

Then, a transmittance of laser light was measured in order to conduct evaluation of the obtained reflection-type light control member. For measurement of the transmittance of laser light, one more glass plate (with a thickness of 1 mm) 6 that was bonded to the palladium thin film 20 of each of samples 1-5 described above via a spacer was used as illustrated in FIG. 5. A predetermined amount of the hydrogen-containing gas was flowed into a gap between the two glass plates 4 and 6 for 35 seconds by a mass-flow controller, and then, a flow of the hydrogen-containing gas was stopped for 5 minutes. As a flow of the hydrogen-containing gas was stopped, air flowed from an opening into the gap between the two glass plates 4 and 6. While this is one cycle, a predetermined number of a flow control of the hydrogen-containing gas was conducted repeatedly and the transmittance of laser light was measured for each 1 second in the meantime. A semiconductor laser with a wavelength of 670 nm was used for a light source and a silicon photodiode was used for a light receiving element.

(For Samples 1-4)

Figure 6:
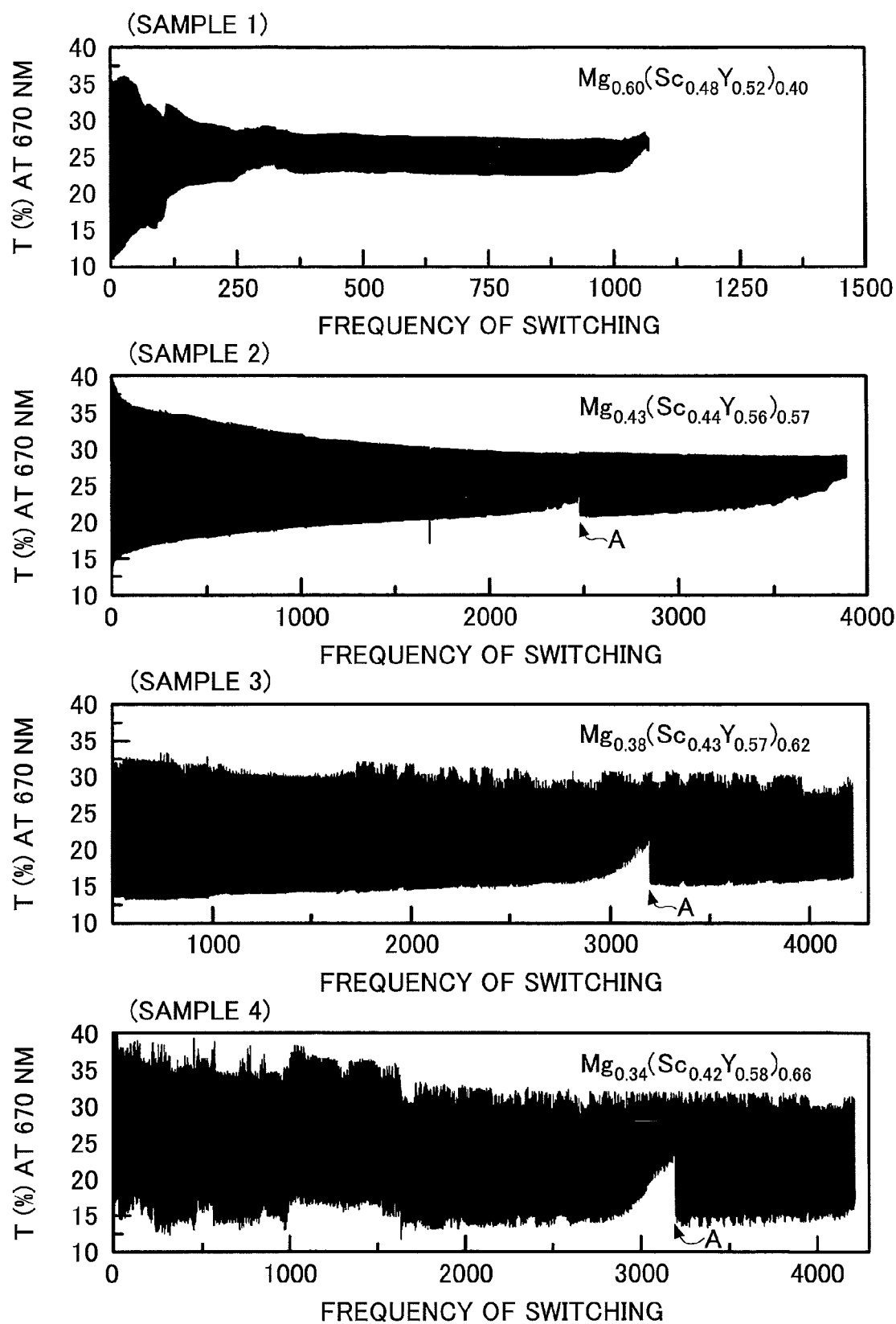
FIG. 6 is a diagram that illustrates a relationship between a frequency of switching of a state between a reflection state and a transparent state for samples 1-4 in Practical Example 1 of the present invention and a laser light transmittance.

FIG. 6 illustrates results of measurement conducted for samples 1-4. In the figure, the results of measurement for samples 1-4 are illustrated in order from the above.

FIG. 6 is such that the number of repetition of a hydrogen supply and stop cycle and a transmittance of laser light are indicated on a transverse axis and a longitudinal axis. A lower limit value and an upper limit value of a transmittance of laser light indicate a reflection state before absorption of hydrogen and a transparent state after the absorption of hydrogen. Accordingly, it is preferable for a width at a side of the longitudinal axis to be large stably independently of the number of the repetition.

Thereby, it was possible to find that any sample had a stable switching repetition durability until at least about 1000 repetitions, even though a buffer layer or an anti-oxidation layer is not provided. Furthermore, it was also possible to find that a nearly colorless state, that is, a high light transmittance was provided in a case of a transparent state caused by hydrogenation.

Then, it was possible to find that a value of x in a formula expressed by $Mg_{1-x}(Sc_{1-y}Y_y)_x$ increased, that is, addition of scandium and yttrium increased, with the order of samples 1-4, and a change (degradation) of a performance as caused by the repetition decreased as the value of x increased.

That is, it was possible to find from this result that it was possible to improve durability by increasing an amount of scandium and yttrium to be added.

In particular, it was possible to confirm that it was possible for samples 3 and 4 to maintain performances at a time of starting of measurement until the number of repetition of switching was at least about 3000.

Here, for samples 2-4, recovery of a sample was slow at the number of repetition that was 2000-3000 during a measurement (points indicated by "A" in the figure), and hence, a measurement was conducted by changing a cycle so as to flow for 65 seconds and stop for 1200 seconds the hydrogen-containing gas.

After a change of the cycle, it was possible to confirm that a value of the transmittance of laser light was improved after absorption and release of hydrogen and even when a rate of release of hydrogen was lowered, it was possible to maintain an original performance by adjusting a cycle of supply and stop of a hydrogen gas.

(For Sample 5)

Next, a switching repetition durability was evaluated for sample 5 ($Mg_{0.23}(Sc_{0.42}Y_{0.58})_{0.77}$) with an amount of scandium and yttrium to be added that was further higher than those of samples 1-4.

A method for evaluation was conducted by a device illustrated in FIG. 5 similarly to the cases of samples 1-4.

Figure 7:
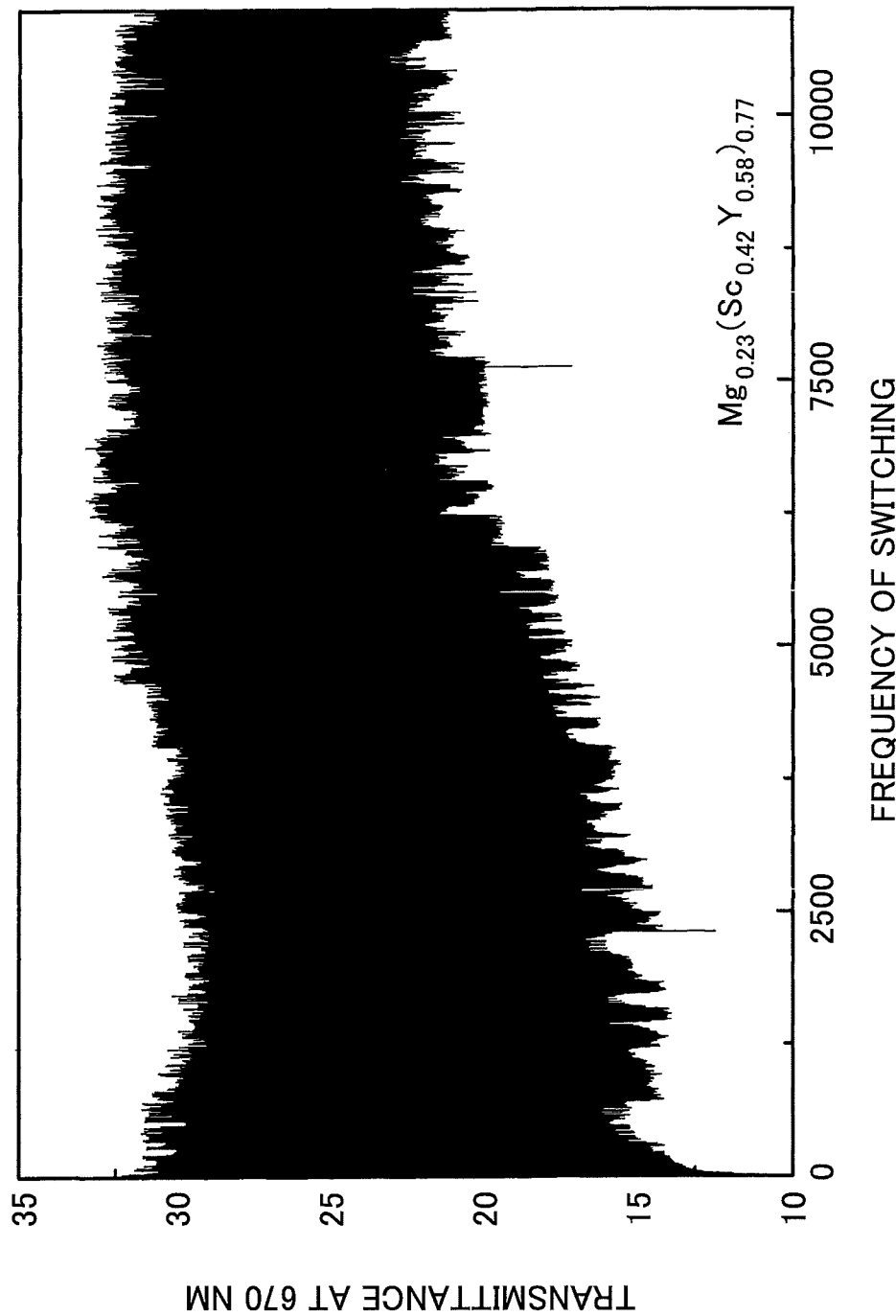
FIG. 7 is a diagram that illustrates a relationship between a frequency of switching of a state between a reflection state and a transparent state for sample 5 in Practical Example 1 of the present invention and a laser light transmittance.

Here, a measurement condition was provided in such a manner that a cycle that flows the hydrogen-containing gas for 35 seconds and then stops a flow of the hydrogen-containing gas for 5 minutes was conducted repeatedly, and was different from those of samples 2-4 in that the cycle was not changed in the meddle. FIG. 7 illustrates a result thereof.

Thereby, it was possible to find that a significant change in a transmittance of laser light was not found even when switching was conducted repeatedly 10000 or more times, and a stable performance was exhibited so that the performance was particularly higher than those of samples 1-4.

Furthermore, it was possible to find that a nearly colorless state, that is, a high light transmittance was provided in a case of a transparent state caused by hydrogenation, and was stable even in a case where repetition was conducted.

As described above, it was possible to find that a reflection-type light control element in an embodiment of the present invention, and a reflection-type light control member and a multilayer glass that use it, had a high switching repetition durability despite of no buffer layer or an anti-oxidation layer, as is also clear from the result of the present practical example.

Practical Example 2

In the present practical example, a reflection-type light control member was fabricated wherein a light control layer 10 that was composed of a magnesium-yttrium-scandium alloy and a catalyst layer 20 were sequentially deposited on a glass substrate that was a transparent member, similarly to Practical Example 1, except that a metallic yttrium target and a metallic scandium target were used instead of a metallic scandium-metallic yttrium target when a magnesium-yttrium-scandium alloy thin film was film-formed. Furthermore, an evaluation thereof was conducted by the sequence described below.

Specifically, a magnesium-yttrium-scandium alloy thin film with a thickness of 48 nm (light control layer 10) and a palladium thin film with a thickness of 7 nm (catalyst layer 20) were sequentially film-formed on a glass substrate 4 with a thickness of 1 mm (transparent member).

Specific film formation conditions of the light control layer 10 and the catalyst layer 20 in the present embodiment will be described.

A film formation of the magnesium-yttrium-scandium alloy thin film as the light control layer 10 and the palladium thin film as the catalyst layer 20 was conducted by using a magnetron sputtering device capable of a multi-element film formation.

A metallic magnesium, a metallic yttrium, a metallic scandium, and a metallic palladium as targets were set at four sputtering guns, respectively.

First, the glass plate was washed, and subsequently, set in a vacuum device and evacuation was conducted in a chamber thereof.

Then, a voltage was simultaneously applied to targets of the metallic magnesium, the metallic yttrium, and the metallic scandium to fabricate a magnesium-yttrium-scandium alloy thin film.

An argon gas pressure during sputtering was 0.3 Pa and sputtering was conducted by applying a predetermined power to each target by a direct current sputtering method. Here, at this time, it was possible to select and/or control a composition of an obtained film (light control layer) depending on a power (electric power) to be applied to each target.

In the present practical example, when a representation of $Mg_{1-x-y}Y_xSc_y$ is provided, samples 6-10 were fabricated in such a manner that x and y were (x, y)=(0.63, 0.02), (0.51, 0.06), (0.60, 0.07), (0.56, 0.13), and (0.48, 0.15), respectively.

A calibration curve of an obtained composition was estimated from a ratio of powers applied to the metallic magnesium target, the metallic yttrium target, and the metallic scandium target by using a film thickness and a metal density, and a composition of a fabricated sample was estimated from this curve.

Table 2 indicates a power applied to a sputtering target in a case where each sample was fabricated.

TABLE 2

| | | Applied electric power (W) | | |
|---|---|---|---|---|
| | Composition | Metallic magnesium target | Metallic yttrium target | Metallic scandium target |
| Sample 6 | $Mg_{0.35}Y_{0.63}Sc_{0.02}$ | 15 | 60 | 7.5 |
| Sample 7 | $Mg_{0.43}Y_{0.51}Sc_{0.06}$ | 15 | 40 | 10 |
| Sample 8 | $Mg_{0.33}Y_{0.60}Sc_{0.07}$ | 10 | 40 | 10 |
| Sample 9 | $Mg_{0.31}Y_{0.56}Sc_{0.13}$ | 10 | 40 | 20 |
| Sample 10 | $Mg_{0.37}Y_{0.48}Sc_{0.15}$ | 10 | 30 | 20 |

Subsequently, a power of 30 W was applied to a target of a metallic palladium on the same vacuum condition to conduct deposition of a palladium thin film.

A reflection-type light control member fabricated in accordance with the aforementioned sequence was in a reflection state of metallic luster, and when a surface of the palladium thin film was exposed to a hydrogen gas at 1 atmosphere that was diluted with argon to 4% by volume (that will be referred to as a "hydrogen-containing gas", below), any sample changed to a transparent state due to hydrogenation of the magnesium-yttrium-scandium alloy thin film. On this condition, when the surface of the palladium thin film was exposed to atmospheric air, a return to the reflection state was caused by dehydrogenation of the magnesium-yttrium-scandium alloy thin film. Thus, it was possible to confirm that a state of the fabricated reflection-type light control member reversibly changed between the transparent state due to hydrogenation and the reflection state due to dehydrogenation.

Then, a light transmittance was measured in order to conduct evaluation of the obtained reflection-type light control member. For measurement of the light transmittance, a device illustrated in FIG. 5 was used similarly to the case of Practical Example 1 except that a light-emitting diode was used instead of a laser as follows. A predetermined amount of the hydrogen-containing gas was flowed into a gap between the two glass plates 4 and 6 for 95 seconds by a mass-flow controller, and then, a flow of the hydrogen-containing gas was stopped for 900 seconds. As a flow of the hydrogen-containing gas was stopped, air flowed from an opening into the gap between the two glass plates 4 and 6. While this is one cycle, a predetermined number of a flow control of the hydrogen-containing gas was conducted repeatedly and the light transmittance was measured for each 1 second in the meantime. A light-emitting diode with a wavelength of 940 nm was used for a light source and a photodiode was used for a light receiving element.

Figure 8:
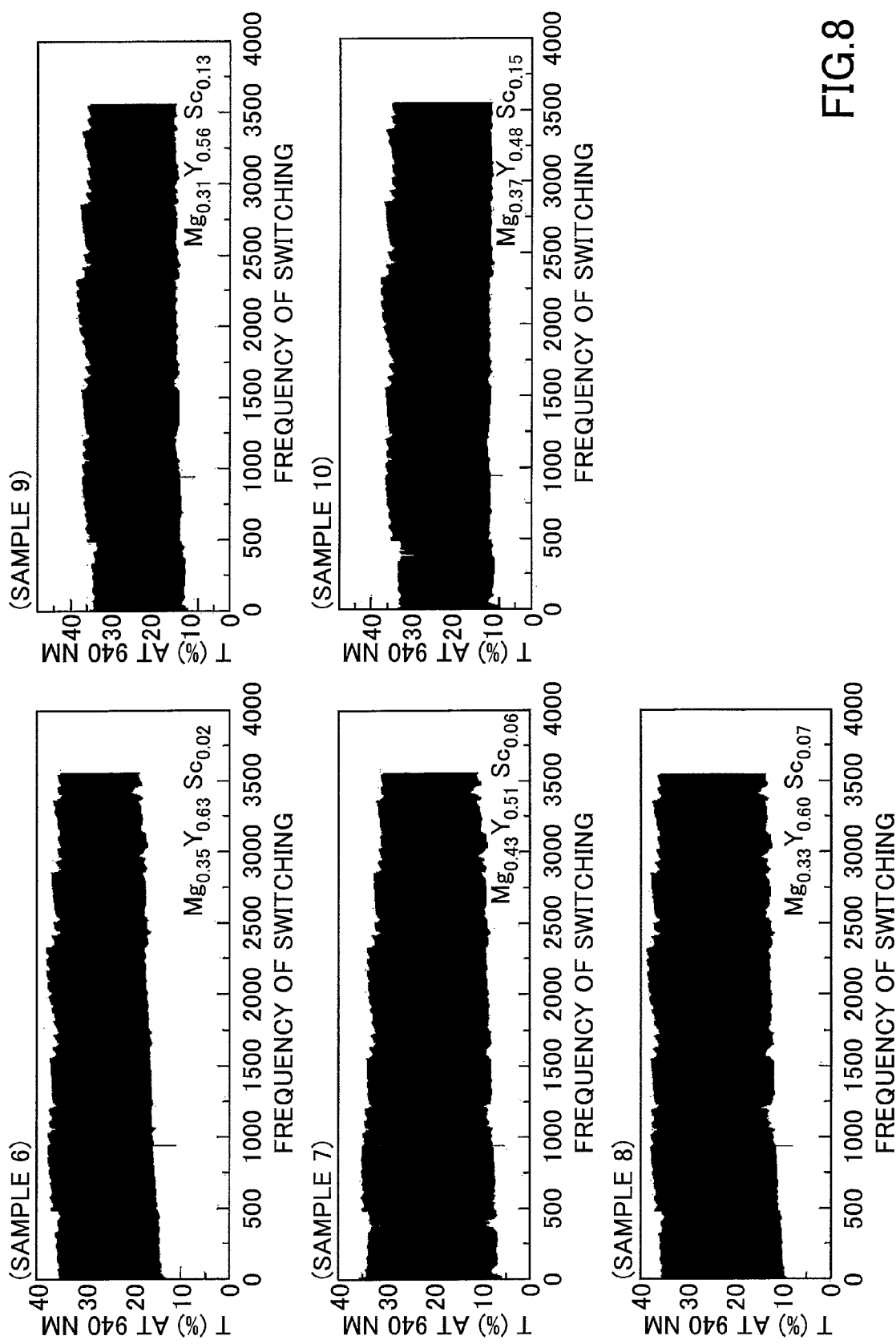
FIG. 8 is a diagram that illustrates a relationship between a frequency of switching of a state between a reflection state and a transparent state for samples 6-10 in Practical Example 2 of the present invention and a light transmittance of a light-emitting diode.

FIG. 8 illustrates results of measurement conducted for samples 6-10. In the figure, the results of measurement for samples 6-10 are illustrated in order from the above.

FIG. 8 is such that the number of repetition of a hydrogen supply and stop cycle and a light transmittance are indicated on a transverse axis and a longitudinal axis, similarly to FIG. 6 for Practical Example 1. A lower limit value and an upper limit value of a light transmittance indicate a reflection state before absorption of hydrogen and a transparent state after the absorption of hydrogen. Accordingly, it is preferable for a width at a side of the longitudinal axis to be large stably independently of the number of the repetition.

Thereby, it was possible to find that any sample had a stable switching repetition durability, even though a buffer layer or an anti-oxidation layer is not provided, because the upper limit value and the lower limit value of the light transmittance were little changed even when switching operations were repeatedly conducted 3500 times. Furthermore, it was also possible to find that a nearly colorless state, that is, a high light transmittance was provided in a case of a transparent state caused by hydrogenation.

Practical Example 3

Then, a reflection-type light control member was fabricated wherein a light control layer 10 that was composed of a magnesium-yttrium-lanthanum alloy and a catalyst layer 20 were sequentially deposited on a glass substrate that was a transparent member, in accordance with a sequence and a condition similar to those of Practical Example 2, except that a metallic lanthanum target was used instead of the metallic scandium target, and an evaluation thereof was conducted.

For a glass substrate 4 that was used (transparent member), one having a thickness of 1 mm was also used similarly, and a magnesium-yttrium-lanthanum alloy thin film with a thickness of 48 nm (light control layer 10) and a palladium thin film with a thickness of 7 nm (catalyst layer 20) were film-formed.

For a power (electric power) applied to targets of the metallic magnesium, the metallic yttrium, and the metallic lanthanum at a time of film formation, 10 W, 40 W, and 15 W were provided to the metallic magnesium target, the metallic yttrium target, and the metallic lanthanum target, to conduct the film formation.

When a calibration curve of an obtained composition was estimated from a ratio of powers applied to the respective targets by using a film thickness and a metal density, and a composition of a fabricated sample was estimated from this curve, $Mg_{0.32}Y_{0.56}La_{0.12}$ was provided.

Subsequently, deposition of a palladium thin film was conducted similarly to Practical Example 2.

In the present practical example, a reflection-type light control member obtained by the aforementioned process was also in a reflection state of metallic luster, and when a surface of the palladium thin film was exposed to a hydrogen gas at 1 atmosphere that was diluted with argon to 4% by volume (hydrogen-containing gas), changing to a transparent state was caused due to hydrogenation of the magnesium-yttrium-lanthanum alloy thin film. On this condition, when the surface of the palladium thin film was exposed to atmospheric air, a return to the reflection state was caused by dehydrogenation of the magnesium-yttrium-lanthanum alloy thin film. Thus, it was possible to confirm that a state of the fabricated reflection-type light control member reversibly changed between the transparent state due to hydrogenation and the reflection state due to dehydrogenation.

Then, a transmittance of laser light was measured in order to conduct evaluation of the obtained reflection-type light control member. For measurement of the transmittance of laser light, the device illustrated in FIG. 5 was used similarly to the case of Practical Example 1. A predetermined amount of the hydrogen-containing gas was flowed into a gap between the two glass plates 4 and 6 for 35 seconds by a mass-flow controller, and then, a flow of the hydrogen-containing gas was stopped for 5 minutes. As a flow of the hydrogen-containing gas was stopped, air flowed from an opening into the gap between the two glass plates 4 and 6. While this is one cycle, a predetermined number of a flow control of the hydrogen-containing gas was conducted repeatedly and the transmittance of laser light was measured for each 1 second in the meantime. A semiconductor laser with a wavelength of 670 nm was used for a light source and a silicon photodiode was used for a light receiving element.

Figure 9:
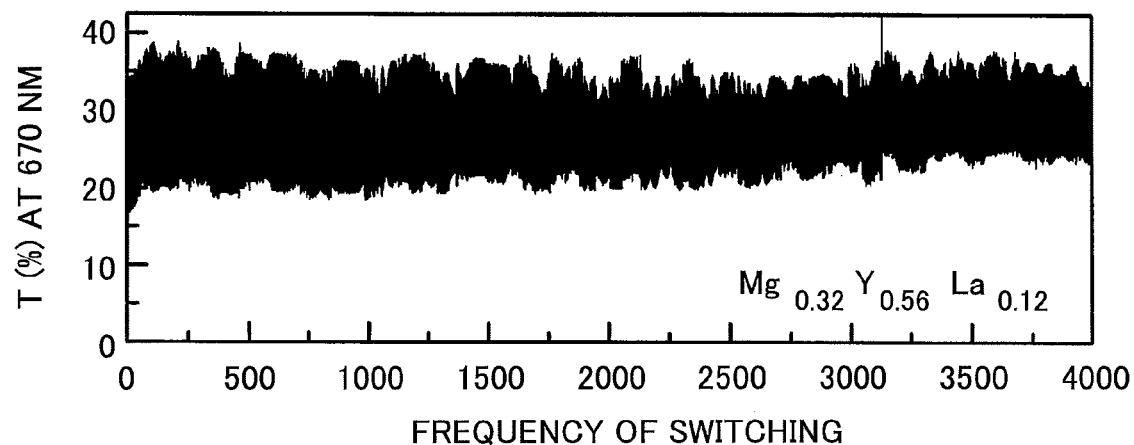
FIG. 9 is a diagram that illustrates a relationship between a frequency of switching of a state between a reflection state and a transparent state for sample 11 in Practical Example 3 of the present invention and a light transmittance of laser light.

FIG. 9 illustrates a measurement result thereof. Thereby, in a case where a magnesium-yttrium-lanthanum alloy thin film was used, it was also possible to confirm a stable switching repetition durability even though a buffer layer or an anti-oxidation layer is not provided, similarly to the magnesium-scandium-yttrium alloy (magnesium-yttrium-scandium alloy) thin film illustrated in Practical Example 1 or 2.

In particular, it was possible to find that there was a little change in a performance thereof even though 4000 repetitions were conducted and a stable switching repetition durability was possessed. Furthermore, it was also possible to find that a nearly colorless state, that is, a high light transmittance was provided in a case of a transparent state caused by hydrogenation.

Practical Example 4

Then, a reflection-type light control member was fabricated wherein a light control layer 10 that was composed of a magnesium-yttrium-cerium alloy and a catalyst layer 20 were sequentially deposited on a glass substrate that was a transparent member, in accordance with a sequence and a condition similar to those of Practical Example 2, except that a metallic cerium target was used instead of the metallic scandium target, and an evaluation thereof was conducted.

For a glass substrate 4 that was used (transparent member), one having a thickness of 1 mm was also used similarly, and a magnesium-yttrium-cerium alloy thin film with a thickness of 48 nm (light control layer 10) and a palladium thin film with a thickness of 7 nm (catalyst layer 20) were film-formed.

For a power (electric power) applied to targets of the metallic magnesium, the metallic yttrium, and the metallic cerium at a time of film formation, 20 W, 60 W, and 30 W were provided to the metallic magnesium target, the metallic yttrium target, and the metallic cerium target, to conduct the film formation.

When a calibration curve of an obtained composition was estimated from a ratio of powers applied to the respective targets by using a film thickness and a metal density, and a composition of a fabricated sample was estimated from this curve, $Mg_{0.37}Y_{0.49}Ce_{0.14}$ was provided.

Subsequently, deposition of a palladium thin film was conducted similarly to Practical Example 2.

In the present practical example, a reflection-type light control member obtained by the aforementioned process was also in a reflection state of metallic luster, and when a surface of the palladium thin film was exposed to a hydrogen gas at 1 atmosphere that was diluted with argon to 4% by volume (hydrogen-containing gas), changing to a transparent state was caused due to hydrogenation of the magnesium-yttrium-cerium alloy thin film. In this state, when the surface of the palladium thin film was exposed to atmospheric air, a return to the reflection state was caused by dehydrogenation of the magnesium-yttrium-cerium alloy thin film. Thus, it was possible to confirm that a state of the fabricated reflection-type light control member reversibly changed between the transparent state due to hydrogenation and the reflection state due to dehydrogenation.

Then, a transmittance of laser light was measured in order to conduct evaluation of the obtained reflection-type light control member. For measurement of the transmittance of laser light, the device illustrated in FIG. 5 was used similarly to the case of Practical Example 1. A predetermined amount of the hydrogen-containing gas was flowed into a gap between the two glass plates 4 and 6 for 35 seconds by a mass-flow controller, and then, a flow of the hydrogen-containing gas was stopped for 5 minutes. As a flow of the hydrogen-containing gas was stopped, air flowed from an opening into the gap between the two glass plates 4 and 6. While this is one cycle, a predetermined number of a flow control of the hydrogen-containing gas was conducted repeatedly and the transmittance of laser light was measured for each 1 second in the meantime. A semiconductor laser with a wavelength of 670 nm was used for a light source and a silicon photodiode was used for a light receiving element.

Figure 10:
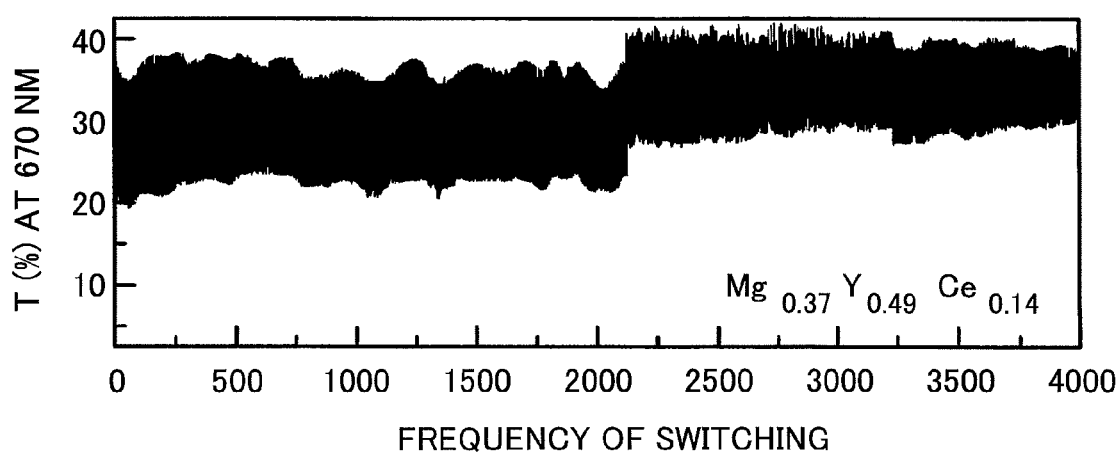
FIG. 10 is a diagram that illustrates a relationship between a frequency of switching of a state between a reflection state and a transparent state for sample 12 in Practical Example 4 of the present invention and a light transmittance of laser light.

FIG. 10 illustrates a measurement result thereof. Thereby, in a case where a magnesium-yttrium-cerium alloy thin film was used, it was also possible to confirm no change in a width of a light transmittance and a stable switching repetition durability even though a buffer layer or an anti-oxidation layer is not provided, similarly to the magnesium-scandium-yttrium alloy (magnesium-yttrium-scandium alloy) thin film illustrated in Practical Example 1 or 2.

In particular, it was possible to find that there was a little change in a performance thereof even though 4000 repetitions were conducted and a stable switching repetition durability was possessed. Furthermore, it was also possible to find that a nearly colorless state, that is, a high light transmittance was provided in a case of a transparent state caused by hydrogenation.

Comparative Example 1

In the present comparative example, a reflection-type light control member that has a light control layer composed of a magnesium-yttrium alloy with no added scandium was fabricated in order to confirm an effect of an alloy that contained scandium in the light control layer in Practical Example 1 or 2.

Specifically, a reflection-type light control member was fabricated in accordance with a sequence and a condition similar to those of sample 10 in Practical Example 2, except that a metallic scandium target was not used when a light control layer 10 was film-formed in a magnetron sputtering device. Thereby, a reflection-type light control member was fabricated wherein a light control layer 10 that was composed of a magnesium-yttrium alloy and a catalyst layer 20 that was composed of a palladium thin film were sequentially deposited on a glass substrate that was a transparent member.

Here, a magnesium-yttrium alloy thin film was film-formed by applying voltages of 10 W and 30 W to a metallic magnesium target and a metallic yttrium target in a magnetron sputtering device. At this time, when a calibration curve of an obtained composition for a light control layer was estimated from a ratio of powers applied to the respective targets by using a film thickness and a metal density, and a composition of a fabricated magnesium-yttrium alloy was estimated from this curve, $Mg_{0.44}Y_{0.56}$ was provided.

Furthermore, film thicknesses of the light control layer 10 and the catalyst layer 20 were also provided to be similar to those of Practical Example 2.

It was possible to confirm that a reflection-type light control member fabricated in accordance with the aforementioned sequence was in a reflection state of metallic luster similarly to sample 10 in Practical Example 2. Furthermore, when a surface of the palladium thin film was exposed to a hydrogen gas at 1 atmosphere that was diluted with argon to 4% by volume (hydrogen-containing gas), changing to a transparent state was caused due to hydrogenation of the magnesium-yttrium alloy thin film. On this condition, when the surface of the palladium thin film was exposed to atmospheric air, a return to the reflection state was caused by dehydrogenation of the magnesium-yttrium alloy thin film. Thus, it was possible to confirm that a state of the fabricated reflection-type light control member in the present comparative example reversibly changed between the transparent state due to hydrogenation and the reflection state due to dehydrogenation.

Then, a light transmittance was measured in order to conduct evaluation of the obtained reflection-type light control member. A method of evaluation was conducted by using a device illustrated in FIG. 5 similarly to the case of Practical Example 2. A predetermined amount of the hydrogen-containing gas was flowed into a gap between the two glass plates 4 and 6 for 95 seconds by a mass-flow controller, and then, a flow of the hydrogen-containing gas was stopped for 900 seconds. As a flow of the hydrogen-containing gas was stopped, air flowed from an opening into the gap between the two glass plates 4 and 6. While this is one cycle, a predetermined number of a flow control of the hydrogen-containing gas was conducted repeatedly and the light transmittance was measured for each 1 second in the meantime. A light-emitting diode with a wavelength of 940 nm was used for a light source and a photodiode was used for a light receiving element.

Figure 11:
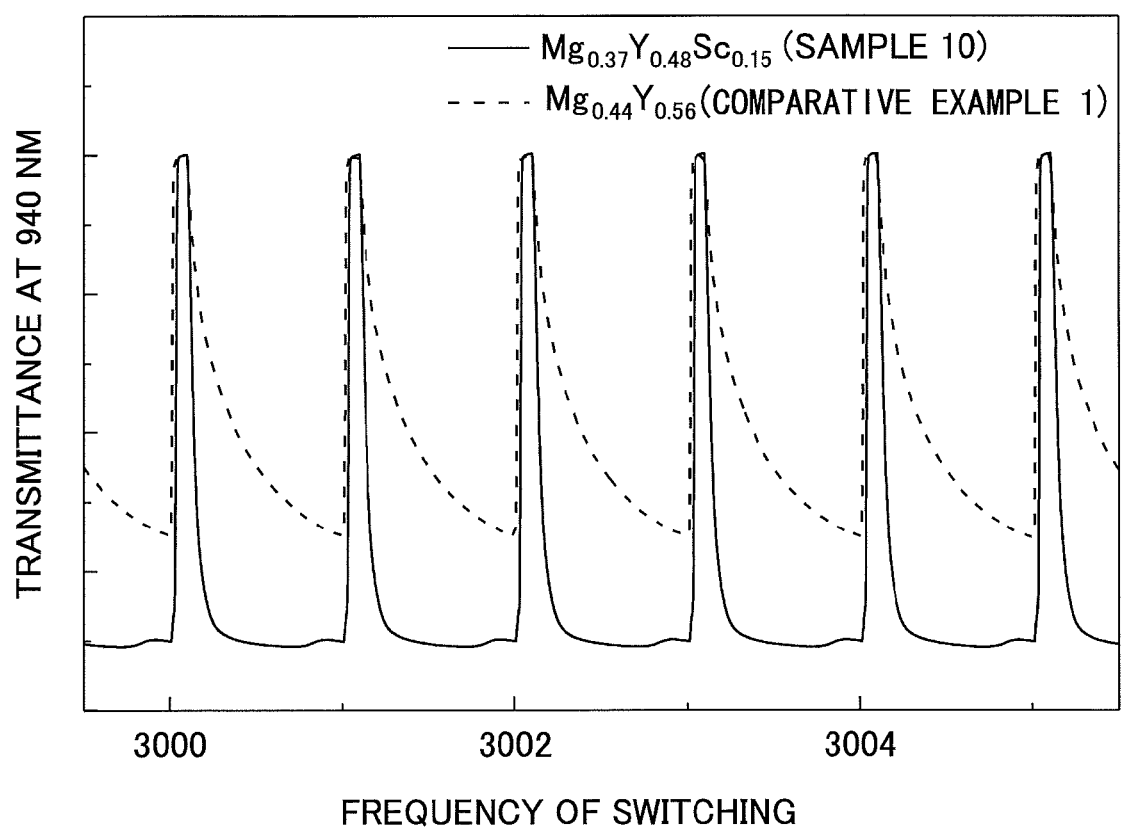
FIG. 11 is a diagram that illustrates a relationship between a frequency of switching of a state between a reflection state and a transparent state for a sample in Comparative Example 1 and a light transmittance of a light-emitting diode.

FIG. 11 illustrates a result of a conducted measurement by a dotted line. Furthermore, the result of sample 10 in Practical Example 2 is indicated by a solid line for comparison, wherein ratios of contained magnesium and yttrium were equal.

FIG. 11 is such that the number of repetition of a hydrogen supply and stop cycle and a light transmittance are indicated on a transverse axis and a longitudinal axis, wherein a change of the transmittance is indicated from 3000th to 3005th switching between flow and stop of the hydrogen-containing gas.

Thereby, it was possible to find that any peak that indicated a change of the light transmittance at a time of absorption or release of hydrogen with respect to sample 10 in Practical Example 2 was sharp during the above-mentioned period of time, whereas a sample in the present comparison example provided a broad one. This indicated that it took time with respect to the sample in the comparative example when a change (return) from the transparent state to a metallic state (mirror state) was caused due to dehydrogenation. That is, it was possible to confirm an effect of accelerating a return from a transparent state to a mirror state due to de hydrogenation by containing scandium in a metallic thin film of a light control layer.

APPENDIX (An Illustrative Embodiment(s) of a Reflection-Type Light Control Element, a Reflection-Type Light Control Member that Uses the Reflection-Type Light Control Element, and a Multilayer Glass)

At least one illustrative embodiment of the present invention may relate to a reflection-type light control element, a reflection-type light control member that uses the reflection-type light control element, and a multilayer glass.

At least one illustrative embodiment of the present invention may be made by taking the aforementioned point(s) into consideration and aim at providing a reflection-type light control element with an excellent durability for a repetition of switching between a transparent state and a reflection state.

At least one illustrative embodiment of the present invention may aim at providing a reflection-type light control element with an excellent durability for a repetition of switching between a transparent state and a reflection state, and a reflection-type light control member and a multilayer glass that use the reflection-type light control element.

At least one illustrative embodiment of the present invention may provide a reflection-type light control element that is provided with a light control layer with a state that is reversibly changed between a transparent state due to a hydrogenation and a reflection state due to a dehydrogenation and a catalyst layer that accelerates the hydrogenation and/or the dehydrogenation in the light control layer, wherein the reflection-type light control element is such that the light control layer is composed of an alloy that includes at least one kind of element selected from group 2 elements and two or more kinds of elements selected from group 3 elements and rare earth elements, and/or a hydride of the alloy.

At least one illustrative embodiment of the present invention may provide a reflection-type light control element that is provided with a light control layer a state that is reversibly changed between a transparent state due to a hydrogenation and a reflection state due to a dehydrogenation and a catalyst layer that accelerates the hydrogenation and/or the dehydrogenation in the light control layer, wherein the reflection-type light control element is such that the light control layer is composed of an alloy that includes at least one element selected from group 2 elements and two or more kinds of elements selected from group 3 elements and rare earth elements, or a hydride of the alloy, and a reflection-type light control member and a multilayer glass that use the reflection-type light control element.

Illustrative Embodiment (1) is a reflection-type light control element that is provided with a light control layer a state that is reversibly changed between a transparent state due to a hydrogenation and a reflection state due to a dehydrogenation and a catalyst layer that accelerates the hydrogenation and/or the dehydrogenation in the light control layer, wherein the reflection-type light control element is such that the light control layer is composed of an alloy that includes at least one kind of element selected from group 2 elements and two or more kinds of elements selected from group 3 elements and rare earth elements and/or a hydride of the alloy.

Illustrative Embodiment (2) is the reflection-type light control element as described in Illustrative Embodiment (1), characterized in that the alloy that includes at least one kind of element selected from group 2 elements and two or more kinds of elements selected from group 3 elements and rare earth elements is a magnesium-yttrium-scandium alloy.

Illustrative Embodiment (3) is the reflection-type light control element as described in Illustrative Embodiment (2), characterized in that the magnesium-yttrium-scandium alloy is represented by $Mg_{1-x-y}Y_xSc_y$ ($0.3<x<0.7$, $0<y<0.6$, and $x+y<1$).

Illustrative Embodiment (4) is the reflection-type light control element as described in any one of Illustrative Embodiments (1)-(3), characterized in that the catalyst layer is composed of a palladium, a platinum, a palladium alloy, or a platinum alloy.

Illustrative Embodiment (5) is the reflection-type light control element as described in any one of Illustrative Embodiments (1)-(4), characterized by being provided with a protection layer that has a hydrogen permeability and a water repellency at an opposite side of the light control layer with reference to the catalyst layer.

Illustrative Embodiment (6) is the reflection-type light control element as described in any one of Illustrative Embodiments (1)-(5), characterized in that a film thickness of the light control layer is equal to or greater than 10 nm and equal to or less than 200 nm.

Illustrative Embodiment (7) is the reflection-type light control element as described in any one of Illustrative Embodiments (1)-(6), characterized in that a film thickness of the catalyst layer is equal to or greater than 1 nm and equal to or less than 20 nm.

Illustrative Embodiment (8) is a reflection-type light control member that is provided with the reflection-type light control element as described in any one of Illustrative Embodiments (1)-(7), characterized in that the reflection-type light control member is further provided with a transparent member at an opposite side of the catalyst layer with reference to the light control layer.

Illustrative Embodiment (9) is the reflection-type light control member as described in Illustrative Embodiment (8), characterized by using a glass or a plastic for the transparent member.

Illustrative Embodiment (10) is a multilayer glass that is provided with two or more of glass plates, characterized in that the multilayer glass is provided with the reflection-type light control element as described in any one of Illustrative Embodiments (1)-(7) on a face of at least one glass plate that is opposed to (an)other glass plate(s).

Illustrative Embodiment (11) is the multilayer glass as described in Illustrative Embodiment (10), characterized by being provided with a glass plate with the reflection-type light control element and an atmosphere controller that supplies and/or exhaust a hydrogen and an oxygen or an air to a gap(s) famed with the (an)other glass plate(s).

According to at least one illustrative embodiment of the present invention, it may be possible to provide a reflection-type light control element with a state close to no color in a case of a transparent state provided by a hydrogenation, that is, a high light transmittance, and further a high switching repetition durability. Furthermore, according to at least one illustrative embodiment of the present invention, it may also possible to obtain an action or effect in such a manner that a recovery from a transparent state to a mirror state (metallic state) due to a dehydrogenation is accelerated by providing a multi-element light control layer.

Although illustrative embodiment(s) embodiments and specific examples of the present invention have been described with reference to the accompanying drawings, the present invention is not limited to any of the illustrative embodiments and the specific examples, and the illustrative embodiments and the specific examples may be altered, modified, or combined without departing from the scope of the present invention.

The present application claims the benefit of priority based on Japanese Patent Application No. 2011-218134 filed on Sep. 30, 2011 and Japanese Patent Application No. 2012-055155 filed on Mar. 12, 2012, and the entire contents of which are herein incorporated by reference.

The invention claimed is:

1. A reflection-type light control element, wherein the reflection-type light control element comprises a light control layer configured to exhibit a reversible change between a transparent state and a reflection state in a reversible reaction with a hydrogen and a catalyst layer configured to accelerate the reversible reaction of the light control layer, and wherein the reflection-type light control element is such that the light control layer includes an alloy that contains at least one kind of element selected from the group consisting of group 2 elements and at least two kinds of elements selected from the group consisting of group 3 elements and rare earth elements or a hydride of the alloy, wherein the reflection-type light control element is such that the alloy is a magnesium-yttrium-scandium alloy represented by $Mg_{1-x-y}Y_xSc_y$ ($0.3<x<0.7, 0<y<0.6$, and $x+y<1$).

2. The reflection-type light control element as claimed in claim 1, wherein the reflection-type light control element is such that the catalyst layer includes a palladium, a platinum, a palladium alloy, or a platinum alloy.

3. The reflection-type light control element as claimed in claim 1, wherein the reflection-type light control element further comprises a protection layer that has a hydrogen permeability and a water repellency at an opposite side of the light control layer in the catalyst layer.

4. The reflection-type light control element as claimed in claim 1, wherein the reflection-type light control element is such that a thickness of the light control layer is equal to or greater than 10 nm and equal to or less than 200 nm.

5. The reflection-type light control element as claimed in claim 1, wherein the reflection-type light control element is such that a thickness of the catalyst layer is equal to or greater than 1 nm and equal to or less than 20 nm.

6. A reflection-type light control member that comprises the reflection-type light control element as clamed in claim 1, wherein the reflection-type light control member further comprises a transparent member at an opposite side of the catalyst layer in the light control layer.

7. The reflection-type light control member as claimed in claim 6, wherein the reflection-type light control member is such that a material of the transparent member includes a glass or a plastic.

8. A multilayer glass, wherein the multilayer glass comprises a plurality of glass plates, and the reflection-type light control element as claimed in claim 1 on a surface of at least one glass plate that is opposed to another glass plate.

9. The multilayer glass as claimed in claim 8, wherein the multilayer glass further comprises an atmosphere controller configured to supply a hydrogen and an oxygen or an air to a gap between the at least one glass plate with the reflection-type light control element and the another glass plate or exhaust a hydrogen and an oxygen or an air from the gap.

* * * * *